(12) United States Patent
Wan et al.

(10) Patent No.: US 10,093,810 B2
(45) Date of Patent: Oct. 9, 2018

(54) COMPOSITE COATINGS AND METHODS THEREFOR

(71) Applicant: General Electric Company, Schenectady, NY (US)

(72) Inventors: Julin Wan, Rexford, NY (US); Milivoj Konstantin Brun, Ballston Lake, NY (US); Peter Joel Meschter, Niskayuna, NY (US); Reza Sarrafi-Nour, Clifton Park, NY (US); Don Mark Lipkin, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1456 days.

(21) Appl. No.: 13/841,371

(22) Filed: Mar. 15, 2013

(65) Prior Publication Data

US 2014/0272344 A1 Sep. 18, 2014

(51) Int. Cl.
| | |
|---|---|
| C09D 5/08 | (2006.01) |
| B05D 7/00 | (2006.01) |
| C04B 41/87 | (2006.01) |
| C04B 41/89 | (2006.01) |
| C04B 41/00 | (2006.01) |

(Continued)

(52) U.S. Cl.
CPC ............... *C09D 5/084* (2013.01); *B05D 7/52* (2013.01); *C04B 41/009* (2013.01); *C04B 41/5066* (2013.01); *C04B 41/52* (2013.01); *C04B 41/87* (2013.01); *C04B 41/89* (2013.01); *C23C 28/044* (2013.01); *C23C 28/048* (2013.01); *C23C 28/42* (2013.01); *F01D 5/288* (2013.01);

(Continued)

(58) Field of Classification Search
CPC ........ B05D 7/52; C09D 5/084; C23C 28/044; C23C 28/048; C23C 28/42; Y10T 428/2495

See application file for complete search history.

(56) References Cited

U.S. PATENT DOCUMENTS

| | | | |
|---|---|---|---|
| 5,300,322 A | 4/1994 | Lowden | |
| 5,429,997 A * | 7/1995 | Hebsur | ............. C04B 35/58092 428/367 |

(Continued)

FOREIGN PATENT DOCUMENTS

| | | |
|---|---|---|
| EP | 1842937 A2 | 10/2007 |
| EP | 1666626 | 7/2008 |

(Continued)

OTHER PUBLICATIONS

Invitation to Pay Additional Fees issued in connection with corresponding WO Patent Application No. US2014/023331 dated Aug. 29, 2014.

(Continued)

*Primary Examiner* — Amber R Orlando
*Assistant Examiner* — Lawrence Ferguson
(74) *Attorney, Agent, or Firm* — GE Global Patent Operation; John Darling

(57) ABSTRACT

An article includes a substrate and a coating provided on a surface of the substrate. The coating includes at least one metal silicide layer consisting essentially of $MoSi_2$ or $WSi_2$ or $(Mo, W)Si_2$ or a platinum group metal silicide and at least one layer consisting essentially of $Si_3N_4$.

24 Claims, 4 Drawing Sheets

(51) Int. Cl.
*C04B 41/50* (2006.01)
*C04B 41/52* (2006.01)
*F01D 5/28* (2006.01)
*C23C 28/04* (2006.01)
*C23C 28/00* (2006.01)

(52) U.S. Cl.
CPC .... *F05D 2230/90* (2013.01); *F05D 2300/177* (2013.01); *Y10T 428/2495* (2015.01)

(56) References Cited

U.S. PATENT DOCUMENTS

| | | | |
|---|---|---|---|
| 5,472,487 | A | 12/1995 | Chin et al. |
| 5,990,025 | A | 11/1999 | Suyama et al. |
| 6,733,908 | B1 | 5/2004 | Lee et al. |
| 7,300,702 | B2 | 11/2007 | Li et al. |
| 2006/0014029 | A1 | 1/2006 | Saak et al. |
| 2006/0251912 | A1 | 11/2006 | Kim et al. |
| 2010/0104859 | A1* | 4/2010 | Berczik ............... C22C 27/04 428/332 |
| 2011/0027558 | A1 | 2/2011 | Kirby et al. |
| 2011/0097589 | A1 | 4/2011 | Meschter |
| 2011/0189911 | A1 | 8/2011 | Mehbubani et al. |

FOREIGN PATENT DOCUMENTS

| | | |
|---|---|---|
| JP | 2006232566 | 9/2006 |
| JP | 2011068861 | 4/2011 |

OTHER PUBLICATIONS

J. Yoon et al., "Low-temperature cyclic oxidation behavior of MoSi2/Si3N4 nanocomposite coating formed on Mo substrate at 773 K," Science Direct, Surface & Coatings Technology, vol. 200, No. 7, pp. 2537-2546, Dec. 21, 2005.

J. Yoon et al., "Formation of crack-free MoSi2ya-Si3N4 composite coating on Mo substrate by ammonia nitridation of Mo5Si3 layer followed by chemical vapor deposition of Si," Elsevier, Surface 7 Coatings Technology, vol. 165, pp. 81-89, 2003.

J. Yoon et al., "Microstructure of MoSi2-base nanocomposite coatings formed on Mo substrates by chemical vapor deposition," vol. 96, No. 3, pp. 281-290, Mar. 2005.

I. Y. Kelina et al., "Resistance of Si3N4/Cf Ceramic-Matrix Composites to High-Temperature Oxidation," Refractories and Industrial Ceramics, vol. 44, No. 4, pp. 249-253, Jul.-Aug. 2003.

F. Smeacetto et al., "Protective coatings for carbon bonded carbon fibre composites," Science Direct, Ceramics International, vol. 34, No. 5, pp. 1297-1301, Jul. 2008.

Machine translation of Japanese Office Action issued in connection with corresponding JP Application No. 2016501207 dated Mar. 13, 2018.

* cited by examiner

COMPOSITE COATINGS AND METHODS THEREFOR

BACKGROUND OF THE TECHNOLOGY

The present technology generally relates to coating systems and methods suitable for protecting articles or components exposed to high-temperature environments, such as the hostile thermal environment of a turbine engine. More particularly, the present technology relates to a coating that may serve as an oxidation resistant coating and/or as a bond coating to an environmental and/or thermal barrier coating.

Ceramic and refractory intermetallic materials and composites are currently being considered for such high temperature applications as combustor liners, vanes, shrouds, blades, and other hot section components of turbine engines, and for use in structures designed for service at high temperature in such applications as heat exchangers and internal combustion engines. Some examples of composite materials include silicon-containing composites, for example, composite materials in which silicon, silicon carbide (SiC), silicon nitride ($Si_3N_4$), and/or a refractory metal silicide serves as a reinforcement phase and/or a matrix phase. However, the environments characteristic of these applications often contain water vapor, which at high temperatures is known to cause significant surface recession and mass loss in silicon-bearing materials. The water vapor reacts with the structural material at high temperatures to form volatile silicon-containing species, often resulting in unacceptably high recession rates.

BRIEF DESCRIPTION OF THE TECHNOLOGY

The present technology provides composite coatings and methods of fabricating the composite coatings on an article or component formed of a silicon-containing material, such as a ceramic matrix composite (CMC). The composite coatings protect silicon-containing articles exposed to high temperatures, including the hostile thermal environment of a turbine engine.

According to one example of the technology, an article comprises a substrate and a coating provided on a surface of the substrate. The coating comprises at least one metal silicide layer consisting essentially of $MoSi_2$, $WSi_2$, or combinations of Mo and W silicide ((Mo, W)$Si_2$), or a platinum group metal silicide and at least one layer consisting essentially of $Si_3N_4$.

According to another example of the technology, an article comprises a substrate including a silicon-containing region that includes SiC, $Si_3N_4$, and/or a transition metal silicide as a reinforcement material in a metallic or a non-metallic matrix; and a coating provided on a surface of the substrate, the coating comprising $MoSi_2$ and $Si_3N_4$, wherein a percentage of $Si_3N_4$ is greater than about 55% by volume of the coating.

According to another example of the technology, a method of coating an article comprises applying a coating to a surface of the substrate, the coating comprising at least one metal silicide layer consisting essentially of $MoSi_2$ or $WSi_2$ or (Mo, W)$Si_2$ or a platinum group metal silicide and at least one layer consisting essentially of $Si_3N_4$.

According to another aspect of the technology, a method of coating an article comprising a substrate including a silicon-containing region that includes SiC, $Si_3N_4$, and/or a transition metal silicide as a reinforcement material in a metallic or a non-metallic matrix is provided, the method comprises applying a coating on a surface of the substrate, the coating comprising $MoSi_2$ and $Si_3N_4$, wherein a percentage of $Si_3N_4$ is greater than about 55% by volume of the coating.

BRIEF DESCRIPTION OF THE DRAWINGS

Other aspects and advantages of this technology will be better appreciated from the following detailed description with reference to the drawings, in which like reference numbers and characters refer to like features of the present technology, and wherein.

DETAILED DESCRIPTION OF THE TECHNOLOGY

The present technology is generally applicable to components or articles that operate within environments characterized by relatively high temperatures, severe thermal cycling and stresses, oxidation, and corrosion. Examples of such components include high and low pressure turbine vanes (nozzles) and blades (buckets), shrouds, combustor liners, augmentor hardware, and other hot section components of turbine engines, though the technology has application to other components.

Figure 1:
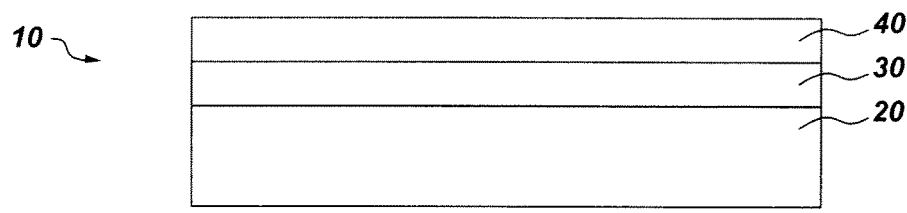
FIG. 1 schematically represents an article including a coating system according to one example of the present technology.

Referring to FIG. 1, a component or article 10 includes a substrate 20 having a coating or coating system 30. The article 10 may also include an environmental barrier coating (EBC) and/or thermal barrier coating (TBC) 40 provided on the coating system 30. The EBC and/or TBC may be, for example, a multilayer coating system. The substrate 20 may include a silicon-containing region. Examples of silicon-containing materials include those with silicon, silicon carbide, silicon nitride, a silicide, for example, a transition metal silicide, wherein the transition metal is a refractory metal such as molybdenum or tungsten or combinations thereof, a platinum group metal such as platinum, iridium, or rhodium, for example in a matrix and/or reinforcement. Further examples include ceramic matrix composites (CMC) that contain silicon carbide as the reinforcement and matrix phases.

The coating system 30 may comprise two primary phases, molybdenum disilicide ($MoSi_2$) and silicon nitride ($Si_3N_4$). The coating system 30 may also comprise minor phases, for example $Mo_5Si_3$, Si, $Mo_5Si_3C$, SiC, and/or $SiN_x$, for processing and/or property reasons. The minor phases may comprise less than 50% of the coating system 30. The percentage by volume of $Si_3N_4$ in the coating system may be greater than about 55%.

Figure 2:
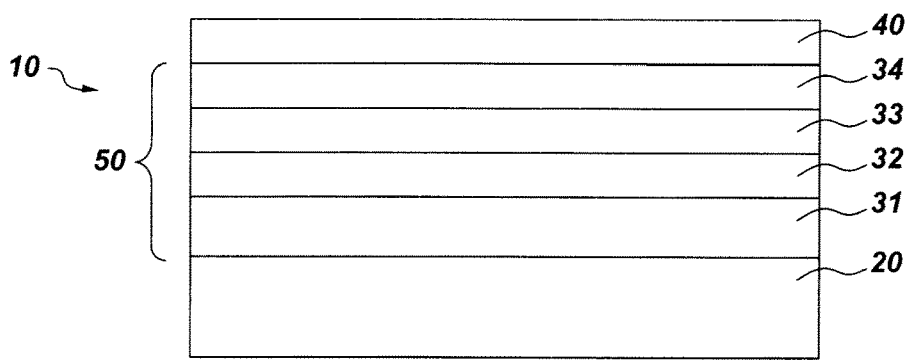
FIG. 2 schematically represents an article including a coating system according to another example of the present technology.

Referring to FIG. 2, a coating system 50 may include alternating layers 31, 33 of $MoSi_2$ and layers 32, 34 of $Si_3N_4$. It should be appreciated that although the initial layer 31 shown in FIG. 2 in contact with the substrate 20 is $MoSi_2$, the initial layer in contact with the substrate 20 may be $Si_3N_4$. It should also be appreciated that although two layers of $MoSi_2$ are shown alternating with two layers of $Si_3N_4$, the number of layers of $MoSi_2$ and $Si_3N_4$ may be any number, including a single layer of each. It should be further appreciated that although the number of layers of $MoSi_2$ and $Si_3N_4$ are shown as equal, the number of layers of each may be unequal. For example, the coating system may include four layers of $MoSi_2$ and three layers of $Si_3N_4$, or vice versa.

Figure 3:
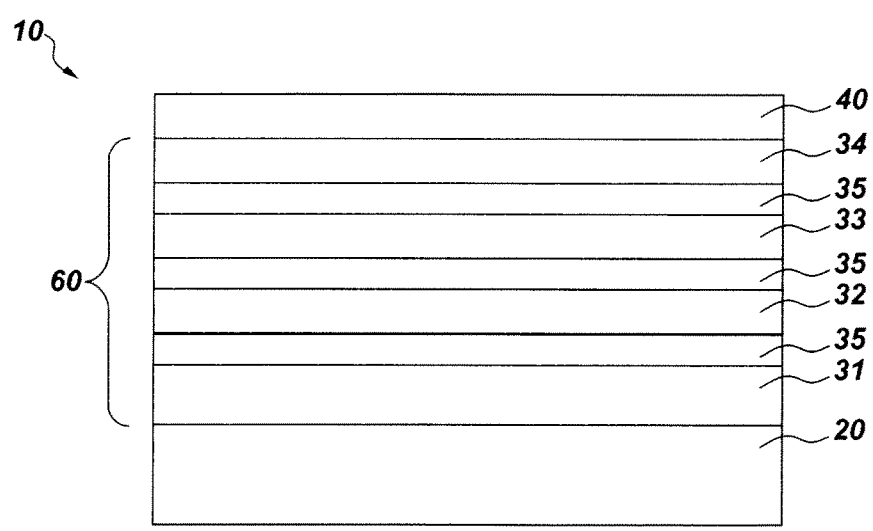
FIG. 3 schematically represents an article including a coating system according to another example of the present technology.

Referring to FIG. 3, a coating system 60 may include alternating layers 31, 33 of $MoSi_2$ and layers 32, 34 of $Si_3N_4$. Transition regions 35 may be provided between the alternating layers 31, 32; 32, 33; 33, 34. The transition regions 35 include a mixture of both phases of $MoSi_2$ and $Si_3N_4$. The transition regions 35 may also include minor phases as described above. The transition regions 35 may be formed as described in more detail below. As discussed above with respect to FIG. 2, although the coating system 60 is shown in FIG. 3 as including a first layer 31 of $MoSi_2$ in contact with the substrate 20 and an equal number of layers of $MoSi_2$ and $Si_3N_4$, it should be appreciated that the coating system 60 may be as described above with respect to the variations of FIG. 2.

Referring to FIGS. 4-7, various methods for coating an article or component including a substrate are schematically illustrated. As like reference numbers refer to like features of the example methods, those features that are common to two or more of the example methods will only be described with reference to one example method.

Figure 4:
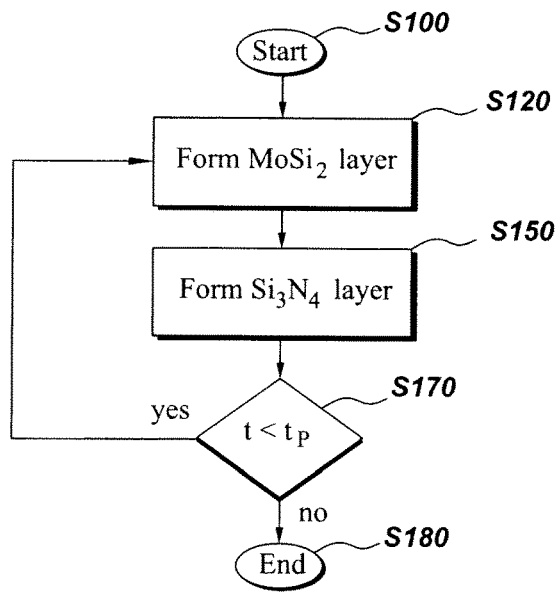
FIG. 4 schematically represents a method according to one example of the present technology.

Referring to FIG. 4, a method of coating an article starts at S100. In S120 $MoSi_2$ is deposited on the surface of the substrate to form a layer of $MoSi_2$ on the substrate.

After formation of the layer of $MoSi_2$, a $Si_3N_4$ layer is formed on the $MoSi_2$ layer in S150. If the combined thickness t of the $MoSi_2$ layer and the $Si_3N_4$ layer is less than a predetermined thickness $t_p$ (S170: Yes), the process returns to S120 for formation of an additional layer of $MoSi_2$. When the combined thickness t of the $MoSi_2$ layer and the $Si_3N_4$ layer is not less than the predetermined thickness $t_p$ (S170: No), the process ends at S180.

Figure 5:
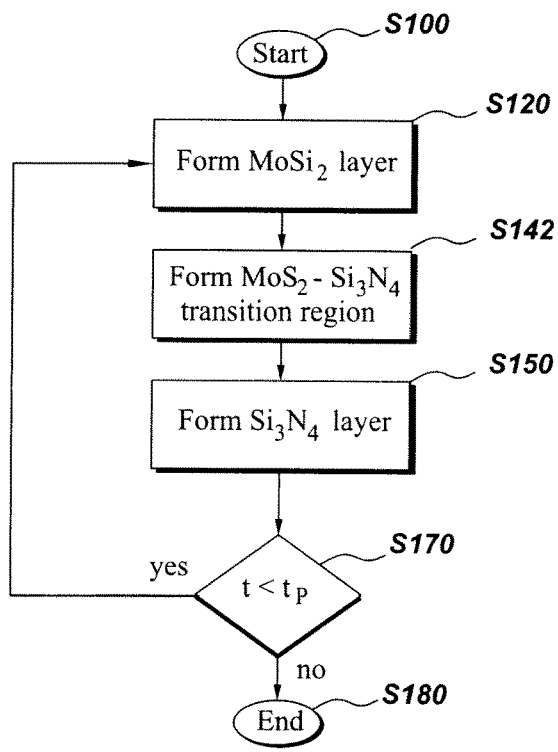
FIG. 5 schematically represents a method according to another example of the present technology.

Referring to FIG. 5, according to another example, a method of coating an article starts in S100. In S142, after formation of the $MoSi_2$ layer, a transition region of $MoSi_2$ and $Si_3N_4$ is formed. The mixture of both phases provides transition regions between the layers of $MoSi_2$ and $Si_3N_4$, for example as described above with reference to FIG. 3.

Figure 6:
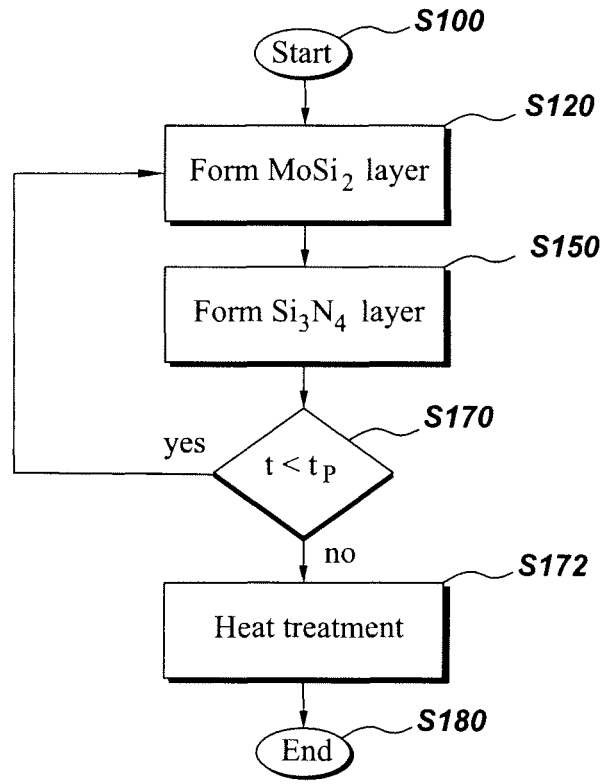
FIG. 6 schematically represents a method according to another example of the present technology.

Referring to FIG. 6, in S172, the alternating $MoSi_2$ and $Si_3N_4$ layers are heat treated to form a dual-phase mixture of $MoSi_2$ and $Si_3N_4$. It should be appreciated that a heat treatment step may also be included in the method illustrated in FIG. 5

Figure 7:
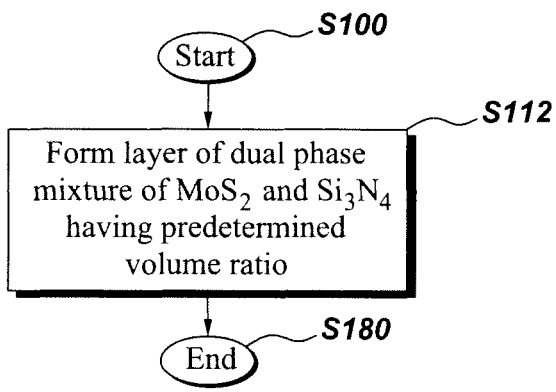
FIG. 7 schematically represents a method according to another example of the present technology.

Referring to FIG. 7, according to another example, in S112 a dual-phase mixture of $MoSi_2$ and $Si_3N_4$ may be formed having a predetermined volume ratio. The process parameters and/or conditions may be determined to achieve a dual-phase mixture of $MoSi_2$ and $Si_3N_4$ with a volume ratio that reduces, or minimizes, a CTE mismatch to the substrate. The process parameters and/or conditions may be determined to control the species and/or volume fraction of the minor phases. The process conditions and/or parameters may be adjusted during the coating process to achieve a coating with a graded microstructure and properties across its thickness.

It should be appreciated that the coatings described herein may be formed by various processes, including for example CVD, ion plasma deposition, and physical vapor deposition (e.g. evaporation or sputtering).

It should further be appreciated that the mechanism of reducing the CTE mismatch between the coating and the substrate operates differently between the examples of layer-by-layer coatings (e.g. FIGS. 2 and 3) and the examples of a layer including a mixture of the phases of $MoSi_2$ and $Si_3N_4$. In the case of the layer-by-layer coatings, the desired ratio of $MoSi_2$ to $Si_3N_4$ thicknesses may be determined from an effective coefficient of thermal expansion $\alpha_{eff}$. For a multilayer coating of $MoSi_2$ and $Si_3N_4$ layers, the effective coefficient of thermal expansion may be calculated using a linear elastic analysis according to the following equation:

$$\alpha_{eff} = (t_{MoSi2}E'_{MoSi2}\alpha_{MoSi2} + t_{Si3N4}E'_{Si3N4}\alpha_{Si3N4})/(t_{MoSi2}E'_{MoSi2} + t_{Si3N4}E'_{Si3N4})$$

where for each material i, $t_i$ is the sum thickness of all layers in the stack, $E'_i$ is the biaxial elastic modulus, defined as $E'_i = E_i/(1-v_i)$, $v_i$ is the Poisson's ratio, and $\alpha_i$ is the thermal expansion coefficient. Rearranging, the ratio of thicknesses is related to the effective thermal expansion by:

$$t_{MoSi2}/t_{Si3N4} = -((\alpha_{eff} - \alpha_{Si3N4})/(\alpha_{eff} - \alpha_{MoSi2}))(E'_{Si3N4}/E'_{MoSi2}).$$

Taking representative values for the materials of interest:
$Si_3N_4$: $\alpha_{Si3N4} = 3.3 \times 10^{-6}/C$; $E_{Si3N4} = 310$ GPa; $v_{Si3N4} = 0.25 \rightarrow E'_{Si3N4} = 413$ GPa;
$MoSi_2$: $\alpha_{MoSi2} = 8.25 \times 10^{-6}/C$; $E_{MoSi2} = 432$ GPA; $v_{MoSi2} = 0.16 \rightarrow E_{MoSi2} = 514$ GPa.

Figure 8:
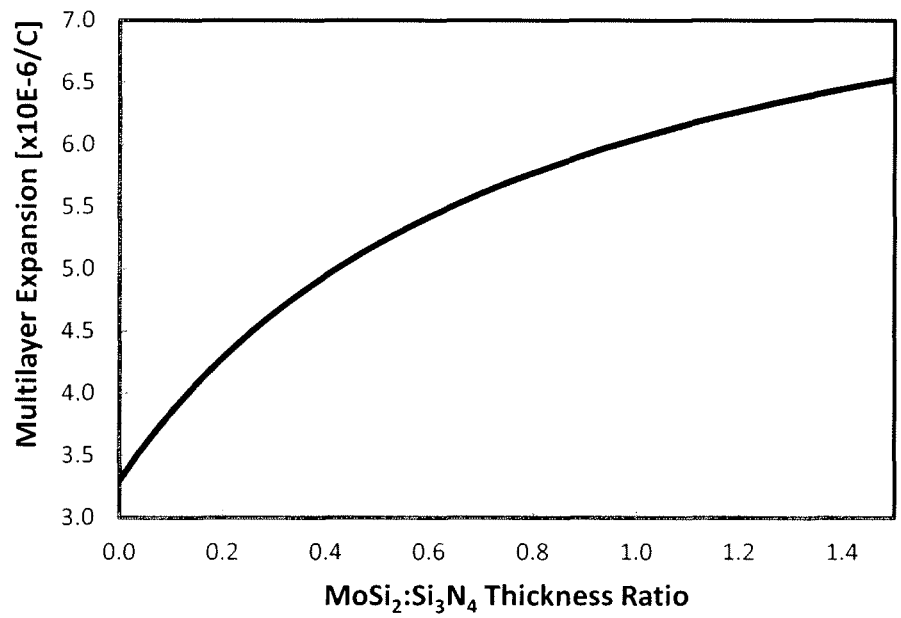
FIG. 8 schematically represents the relationship of multilayer expansion to a thickness ratio.
Figure 9:
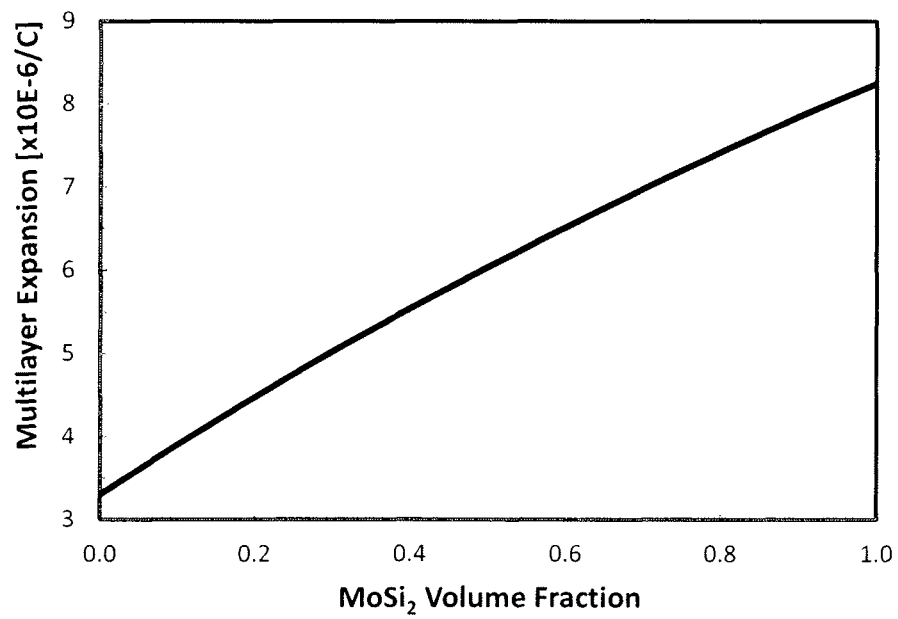
FIG. 9 schematically represents the relationship of multilayer expansion to a volume fraction.

The relationship between the multilayer expansion and the thickness ratio is illustrated in FIG. 8 and the relationship between the multilayer expansion and volume fraction is illustrated in FIG. 9.

In considering examples of, for example, a substrate having a SiC matrix and SiC reinforcement, to match the CTE of SiC ($\alpha_{eff} = \alpha_{SiC} \sim 4.5 \times 10^{-6}/C$), $t_{MoSi2}/t_{Si3N4} \sim 0.26$. To match the CTE of SiC+25% ($\alpha_{eff} = 1.25\alpha_{SiC} \sim 6.9 \times 10^{-6}/C$), $t_{MoSi2}/t_{Si3N4} \sim 0.71$. To match the CTE of SiC−25% ($\alpha_{eff} = 0.75\alpha_{SiC} \sim 3.4 \times 10^{-6}/C$), $t_{MoSi2}/t_{Si3N4} \sim 0.01$.

A $MoSi_2$:$Si_3N_4$ thickness ratio may thus be, for example, about 0.01 to about 0.75, or for example about 0.01 to about 0.45. The corresponding $MoSi_2$ volume fractions ($V_{MoSi2}$), calculated as $V_{MoSi2} = t_{MoSi2}/(t_{Si3N4} + t_{MoSi2})$, may thus be, for example about 1 to about 45 vol % $MoSi_2$, or for example about 10 to about 30 vol % $MoSi_2$.

It should be appreciated that $WSi_2$ or (Mo, W)$Si_2$ or Platinum (Pt) group silicides may be used in place of $MoSi_2$ in the examples discussed above.

When a $MoSi_2$ or $WSi_2$ or a (Mo, W)$Si_2$/$Si_3N_4$ mixture is oxidized in an oxygen-bearing atmosphere such as air, the Si is preferentially oxidized while the Mo and/or W is rejected into the coating. If the coating is thick with respect to the $SiO_2$ layer formed by oxidation, the silicide or silicide/$Si_3N_4$ mixture is largely preserved in the substrate beneath the oxide, and the excess Mo and/or W rejected into the bulk of the coating forms $Mo_5Si_3$ and/or $W_5Si_3$ particles.

On the other hand, if the silicide is a Pt group silicide interlayered with $Si_3N_4$, the Pt group metal will be left behind when all of the Si in the silicide layer has been consumed because condensed-phase oxides of the Pt group metals are not stable at temperatures above 1400° C. The final state of the silicide layer is likely to be an amorphous SiO$_2$ layer with second phase Pt group metal particles. Oxidation will then pass on into the Si$_3$N$_4$ layer below the silicide layer, and so on, with few or no negative consequences.

While the technology has been described in terms of the disclosed examples, it should be appreciated that other forms could be adopted by one skilled in the art. Therefore, the scope of the inventions is to be defined only by the following claims.

The invention claimed is:

1. An article, comprising:
a substrate; and
a coating provided on a surface of the substrate, the coating comprising
at least one metal silicide layer consisting essentially of MoSi$_2$ or WSi$_2$ or (Mo, W)Si$_2$ or a platinum group metal silicide; and
at least one layer consisting essentially of Si$_3$N$_4$, wherein a thickness ratio of the at least one metal silicide layer and the at least one layer of Si$_3$N$_4$ provides the coating with a coefficient of thermal expansion substantially equal to a coefficient of thermal expansion of the substrate.

2. The article according to claim 1, wherein the at least one metal silicide layer is in contact with the surface of the substrate.

3. The article according to claim 1, wherein the at least one layer of Si$_3$N$_4$ is in contact with the surface of the substrate.

4. The article according to claim 1, further comprising:
at least one transition region between the at least one metal silicide layer and the at least one layer of Si$_3$N$_4$, the transition region including a mixture of both the metal silicide layer and Si$_3$N$_4$.

5. The article according to claim 1, further comprising:
a plurality of metal silicide layers consisting essentially of MoSi$_2$ or WSi$_2$ or (Mo, W)Si$_2$ or a platinum group metal silicide; and
a plurality of layers consisting essentially of Si$_3$N$_4$, wherein the layers of metal silicide and Si$_3$N$_4$ are alternating.

6. The article according to claim 1, wherein the substrate includes SiC, Si$_3$N$_4$, a transition metal silicide, and/or silicon as a reinforcement or matrix phase.

7. The article according to claim 1, further comprising:
at least one of an environmental barrier coating and a thermal barrier coating provided on the coating.

8. The article according to claim 1, wherein a percentage of Si$_3$N$_4$ is greater than about 55% by volume of the coating.

9. The article according to claim 1, wherein the at least one metal silicide layer consists essentially of MoSi$_2$ that is about 1% to about 45% of the volume of the coating.

10. The article according to claim 1, wherein the least one metal silicide layer consists essentially of MoSi$_2$ and a ratio of the thickness of the at least one layer of MoSi$_2$ to the thickness of the at least one layer of Si$_3$N$_4$ is about 0.01 to about 0.75.

11. An article, comprising:
a substrate including a silicon-containing region that includes SiC, Si$_3$N$_4$, a transition metal silicide, and/or silicon as a reinforcement material in a metallic or a non-metallic matrix; and
a coating provided on a surface of the substrate, the coating comprising MoSi$_2$ and Si$_3$N$_4$, wherein a percentage of Si$_3$N$_4$ is greater than about 55% by volume of the coating, wherein a thickness ratio of the at least one metal silicide layer and the at least one layer of Si$_3$N$_4$ provides the coating with a coefficient of thermal expansion substantially equal to a coefficient of thermal expansion of the substrate.

12. The article according to claim 11, wherein the MoSi$_2$ and Si$_3$N$_4$ are in a mixture.

13. The article according to claim 12, wherein the mixture is functionally graded.

14. The article according to claim 12, wherein the mixture further comprises: Mo$_5$Si$_3$, Si, and/or SiN$_x$.

15. An article, comprising:
a substrate formed of a ceramic matrix composite that contains SiC as a reinforcement and a matrix phase; and
a coating provided on a surface of the substrate, the coating comprising
at least one metal silicide layer consisting essentially of MoSi$_2$ or WSi$_2$ or (Mo, W)Si$_2$ or a platinum group metal silicide; and
at least one layer consisting essentially of Si$_3$N$_4$, wherein a thickness ratio of the at least one metal silicide layer and the at least one layer of Si$_3$N$_4$ provides the coating with a coefficient of thermal expansion substantially equal to a coefficient of thermal expansion of the substrate.

16. The article according to claim 15, further comprising:
at least one transition region between the at least one metal silicide layer and the at least one layer of Si$_3$N$_4$, the transition region including a mixture of both the metal silicide layer and Si$_3$N$_4$.

17. The article according to claim 15, wherein a percentage of Si$_3$N$_4$ is greater than about 55% by volume of the coating and the at least one metal silicide layer consists essentially of MoSi$_2$ that is about 1% to about 45% of the volume of the coating.

18. The article according to claim 15, wherein the least one metal silicide layer consists essentially of MoSi$_2$ and a ratio of the thickness of the at least one layer of MoSi$_2$ to the thickness of the at least one layer of Si$_3$N$_4$ is about 0.01 to about 0.75.

19. The article according to claim 15, further comprising:
at least one of an environmental barrier coating and a thermal barrier coating provided on the coating.

20. An article, comprising:
a substrate formed of a ceramic matrix composite that contains SiC as a reinforcement and a matrix phase; and
a coating provided on a surface of the substrate, the coating comprising MoSi$_2$ and Si$_3$N$_4$, wherein a percentage of Si$_3$N$_4$ is greater than about 55% by volume of the coating, wherein a thickness ratio of the at least one metal silicide layer and the at least one layer of Si$_3$N$_4$ provides the coating with a coefficient of thermal expansion substantially equal to a coefficient of thermal expansion of the substrate.

21. The article according to claim 20, wherein the MoSi$_2$ and Si$_3$N$_4$ are in a mixture.

22. The article according to claim 21, wherein the mixture is functionally graded.

23. The article according to claim 21, wherein the mixture further comprises:
Mo$_5$Si$_3$, Si, and/or SiN$_x$.

24. The article according to claim 20, further comprising:
at least one of an environmental barrier coating and a thermal barrier coating provided on the coating.

* * * * *